(12) United States Patent
Tokunaga et al.

(10) Patent No.: US 11,066,325 B2
(45) Date of Patent: Jul. 20, 2021

(54) ALKALI-FREE GLASS

(71) Applicant: AGC Inc., Chiyoda-ku (JP)

(72) Inventors: Hirofumi Tokunaga, Chiyoda-ku (JP); Kazutaka Ono, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 352 days.

(21) Appl. No.: 16/161,220

(22) Filed: Oct. 16, 2018

(65) Prior Publication Data
US 2019/0047899 A1   Feb. 14, 2019

Related U.S. Application Data

(63) Continuation of application No. PCT/JP2017/015923, filed on Apr. 20, 2017.

(30) Foreign Application Priority Data

Apr. 27, 2016  (JP) .............................. JP2016-088988

(51) Int. Cl.
C03C 3/091  (2006.01)

(52) U.S. Cl.
CPC .................................. C03C 3/091 (2013.01)

(58) Field of Classification Search
CPC ....................................................... C03C 3/091
See application file for complete search history.

(56) References Cited

U.S. PATENT DOCUMENTS

| 2002/0013210 | A1  | 1/2002 | Peuchert et al. |
| 2015/0030827 | A1  | 1/2015 | Gomez et al. |
| 2015/0087495 | A1* | 3/2015 | Nishizawa ............... C03C 3/093 501/67 |
| 2016/0009590 | A1* | 1/2016 | Ellison .................... C03C 3/091 501/67 |

FOREIGN PATENT DOCUMENTS

| JP | 5-232458 | 9/1993 |
| JP | 9-156953 | 6/1997 |
| JP | 2001-172041 | 6/2001 |
| JP | 2001-220172 | 8/2001 |
| JP | 2012-41217 | 3/2012 |
| JP | WO2013/183626 A1 | 12/2013 |
| JP | 2015-83533 | 4/2015 |
| JP | 2015083533 A * | 4/2015 ............ C03C 3/091 |
| JP | 2015-516930 | 6/2015 |

OTHER PUBLICATIONS

International Search Report dated Jul. 18, 2017 in PCT/JP2017/015923, filed on Apr. 20, 2017 (with English Translation).

* cited by examiner

*Primary Examiner* — Elizabeth A. Bolden

(74) *Attorney, Agent, or Firm* — Oblon, McClelland, Maier & Neustadt, L.L.P.

(57) ABSTRACT

To provide an alkali-free glass having a high specific elastic modulus, a suitable strain point, a low density, a not too low thermal expansion coefficient, a good clarity and a good solubility.

An alkali-free glass, which comprises, as represented by mol % based on oxides, $SiO_2$: 62 to 70%, $Al_2O_3$: 11 to 14%, $B_2O_3$: 3 to 6%, MgO: 7 to 10%, CaO: 3 to 9%, SrO: 1 to 5% and BaO: 0 to 1%, wherein $[SiO_2]+0.7[Al_2O_3]+1.2[B_2O_3]+0.5[MgO]+0.4[CaO]-0.25[SrO]-0.88[BaO]$ is at least 85, $[SiO_2]+0.45[Al_2O_3]+0.21[B_2O_3]-0.042[MgO]+0.042[CaO]+0.15[SrO]+0.38[BaO]$ is from 72 to 75, $0.4[SiO_2]+0.4[Al_2O_3]+0.25[B_2O_3]-0.7[MgO]-0.88[CaO]-1.4[SrO]-1.7[BaO]$ is at most 19, the specific modulus is at least 32 MN·m/kg, the strain point is from 690 to 710° C., the density is at most 2.54 g/cm³, the average thermal expansion coefficient at from 50 to 350° C. is at least $35 \times 10^{-7}$/° C., and the temperature $T_2$ at which the glass viscosity reaches $10^2$ dPa·s is from 1,610 to 1,680° C.

10 Claims, No Drawings

ALKALI-FREE GLASS

This application is a continuation of PCT Application No. PCT/JP2017/015923, filed on Apr. 20, 2017, which is based upon and claims the benefit of priority from Japanese Patent Application No. 2016-088988 filed on Apr. 27, 2016. The contents of those applications are incorporated herein by reference in their entireties.

TECHNICAL FIELD

The present invention relates to an alkali-free glass suitable as a substrate glass for various displays and photomasks.

BACKGROUND ART

Heretofore, glass to be used as a glass plate (glass substrate) for various displays and photomasks, particularly glass to be used for a glass plate wherein a thin film made of a metal, an oxide or the like is formed on its surface, is required to have the following properties (1) to (4).

(1) Not substantially containing alkali metal ions, because if glass contains an alkali metal oxide, alkali metal ions diffuse in the thin film, resulting in deterioration of film characteristics.

(2) Having a high strain point so that deformation of a glass plate and shrinkage (thermal shrinkage) due to structure stabilization of glass can be minimized when the glass plate is exposed to high temperature in a thin film formation step.

(3) Having sufficient chemical durability to various chemicals to be used in semiconductor formation, in particular, having durability to buffered hydrofluoric acid (BHF: mixed liquid of hydrofluoric acid and ammonium fluoride) for etching $SiO_x$ or $SiN_x$, a chemical solution containing hydrochloric acid to be used for etching ITO, various acids (such as nitric acid or sulfuric acid) used for etching a metal electrode, and an alkaline of a resist removing liquid.

(4) Having no defects (such as bubbles, striae, inclusions, pits and flaws) in the inside and on the surface.

In addition to the above requirements, recently, the following (5) to (9) are required.

(5) Reduction in weight of a display is required, and glass itself is also required to be glass having a small specific gravity.

(6) Reduction in weight of a display is required, and a decrease in thickness of a glass plate is desired.

(7) In addition to conventional amorphous silicon (a-Si) type liquid crystal displays, polycrystal silicon (p-Si) type liquid crystal displays requiring a high heat treatment temperature have come to be produced (heat resistance of a-Si: about 350° C., heat resistance of p-Si: from 350 to 5500° C.). Accordingly, glass is desired to have heat resistance.

(8) In order to improve productivity and increase thermal shock resistance by increasing the rate of rising and falling temperature in heat treatment for producing a liquid crystal display, glass having a small average thermal expansion coefficient is required. On the other hand, if glass has a too small average thermal expansion coefficient, and respective film-formation steps for a gate metal film, a gate insulating film, etc. at the time of producing a liquid crystal display increases, the glass largely warps, which results in defects such as breakage or scratch at the time of conveying the liquid crystal display, and thereby problems such as a large error in exposure pattern result.

(9) Further, in recent years, along with the increase in the plate size and the decrease in the plate thickness of the glass substrate, glass having a high specific elastic modulus (Young's modulus/density) has been desired.

In order to meet the above requirements, heretofore, for example, various glass compositions have been proposed for glass for a liquid crystal display panel (Patent Documents 1 to 4).

PRIOR ART DOCUMENTS

Patent Documents

Patent Document 1: JP-A-2001-172041
Patent Document 2: JP-A-H5-232458
Patent Document 3: JP-A-2012-41217
Patent Document 4: WO2013/183626

DISCLOSURE OF INVENTION

Technical Problem

For example, in the case of a thin glass plate having a thickness of at most 1 mm, particularly in the case of large size, the deflection due to its own weight or the large warpage due to various film formations is problematic. The deflection or the warpage can be suppressed by increasing the specific elastic modulus (Young's modulus/density). However, conventional alkali-free glass having a high specific elastic modulus has a too high strain point, and thereby such glass has problems such as a too high density, a poor clarity, a poor solubility and a too low thermal expansion coefficient.

It is an object of the present invention to provide an alkali-free glass, whereby the above problems can be overcome, namely, an alkali-free glass having a high specific elastic modulus, a suitable strain point, a low density, a not too low thermal expansion coefficient, a good clarity and a good solubility.

Solution to Problem

The present invention has the following embodiments.
[1] An alkali-free glass, which comprises, as represented by mol % based on oxides,
$SiO_2$ 62 to 70%,
$Al_2O_3$ 11 to 14%,
$B_2O_3$ 3 to 6%,
MgO 7 to 10%,
CaO 3 to 9%,
SrO 1 to 5% and
BaO 0 to 1%,
wherein $[SiO_2]+0.7[Al_2O_3]+1.2[B_2O_3]+0.5[MgO]+0.4[CaO]-0.25[SrO]-0.88[BaO]$ is at least 85, $[SiO_2]+0.45[Al_2O_3]+0.21[B_2O_3]-0.042[MgO]+0.042[CaO]+0.15[SrO]+0.38[BaO]$ is from 72 to 75, $0.4[SiO_2]+0.4[Al_2O_3]+0.25[B_2O_3]-0.7[MgO]-0.88[CaO]-1.4[SrO]-1.7[BaO]$ is at most 19, the specific modulus is at least 32 MN·m/kg, the strain point is from 690 to 710° C., the density is at most 2.54 g/cm$^3$, the average thermal expansion coefficient at from 50 to 350° C. is at least $35 \times 10^{-7}$/° C., and the temperature $T_2$ at which the glass viscosity reaches $10^2$ dPa·s is from 1,610 to 1,680° C.
[2] The alkali-free glass according to Claim 1, wherein $[MgO] \geq [CaO] \geq [SrO] \geq [BaO]$.
[3] The alkali-free glass according to [1], wherein $[MgO] > [CaO] > [SrO] > [BaO]$.

[4] The alkali-free glass according to [1], wherein MgO+CaO+SrO+BaO is from 15 to 21%.
[5] The alkali-free glass according to [1], wherein MgO/(MgO+CaO+SrO+BaO) is from 0.35 to 0.70.
[6] The alkali-free glass according to [1], wherein the temperature $T_4$ at which the glass viscosity reaches $10^4$ dPa·s is at most 1,320° C.
[7] The alkali-free glass according to [1], wherein the devitrification viscosity is at least $10^{3.6}$ d·Pas.
[8] The alkali-free glass according to [1], wherein the Young's modulus is at least 81 GPa.
[9] The alkali-free glass according to [1], wherein ($T_2$-strain point) is from 920 to 1,000° C.
[10] The alkali-free glass according to [1], wherein the glass transition temperature is from 730 to 770° C.
[11] The alkali-free glass according to [1], which is a glass plate having a thickness of from 0.1 to 2.0 mm.
[12] The alkali-free glass according to [1], which is produced by a float method or a fusion method.

Advantageous Effects of Invention

The alkali-free glass of the present invention has a low specific gravity and thin but is not likely to bend, its production efficiency is good, and suitable properties as a substrate glass for a display, a photomask, etc.

DESCRIPTION OF EMBODIMENTS

Now, the alkali-free glass of the present invention will be described.

In the following, the composition ranges of respective components of the glass will be represented by mol % based on oxides.

If the content of $SiO_2$ is less than 62 mol % (hereinafter simply represented by "%"), the strain point tends not to sufficiently increase, the average thermal expansion coefficient tends to increase, and the specific gravity tends to increase. Accordingly, the content of $SiO_2$ is at least 62%, preferably at least 63%, more preferably at least 64%, particularly preferably at least 65%, most preferably at least 65.5%.

If the content of $SiO_2$ exceeds 70%, the meltability of glass decreases, the Young's modulus decreases, and the devitrification temperature rises. Accordingly, the content of $SiO_2$ is at most 70%, preferably at most 69%, more preferably at most 68%, further preferably at most 67%, particularly preferably at most 66.7%, most preferably at most 66.5%.

$Al_2O_3$ increases the Young's modulus, which results in suppressing deflection, suppresses phase-separation of glass, decreases the average thermal expansion coefficient, increases the strain point, and improves the fracture toughness value, which results in improving the strength of the glass. If the content of $Al_2O_3$ is less than 11%, these effects are not likely to be obtained, other components which increase the average thermal expansion coefficient, relatively increase, and as a result, the average thermal expansion coefficient tends to increase. Accordingly, the content of $Al_2O_3$ is at least 11%, preferably at least 11.5%, more preferably at least 12%.

If the content of $Al_2O_3$ exceeds 14%, the meltability of glass may deteriorate, and the devitrification temperature may rise. Accordingly, the content of $Al_2O_3$ is at most 14%, preferably at most 13.5%, more preferably at most 13%.

$B_2O_3$ improves BHF resistance, improves the melting reactivity of glass and decreases the devitrification temperature. If the content of $B_2O_3$ is less than 3%, these effects are not likely to be obtained, the BHF resistance tends to deteriorate, and the strain point tends to be too high. Accordingly, the content of $B_2O_3$ is at least 3%, preferably at least 3.5%, more preferably at least 4%.

If the content of $B_2O_3$ exceeds 6%, the surface roughness of a glass plate after etching treatment with hydrofluoric acid (hereinafter referred to also as "thinning treatment") becomes large, and thereby, the strength after the thinning treatment tends to be low, and the strain point tends to be low. Accordingly, the content of $B_2O_3$ is at most 6%, preferably at most 5.5%, more preferably at most 5.2%, further preferably at most 5%.

MgO increases the Young's modulus without increasing the specific gravity, whereby the problem of deflection can be reduced by increasing the specific elastic modulus, and improves the fracture toughness value, which results in improving the strength of glass. Further, MgO also improves the meltability. If the content of MgO is less than 7%, these effects are not likely to be obtained, and the thermal expansion coefficient may be too low. Accordingly, the content of MgO is at least 7%, preferably at least 7.3%, more preferably at least 7.5%.

However, if the content of MgO is too large, the devitrification temperature tends to rise. Accordingly, the content of MgO is at most 10%, preferably at most 9%, more preferably at most 8.8%.

CaO has characteristics which increase the specific elastic modulus and do not excessively decrease the strain point, and improves the meltability similarly to MgO. Further, CaO also has a characteristic which suppresses the devitrification temperature from rising, as compared with MgO. If the content of CaO is less than 3%, these effects are not likely to be obtained. Accordingly, the content of CaO is at least 3%, preferably at least 4%, more preferably at least 4.5%.

If the content of CaO exceeds 9%, the average thermal expansion coefficient tends to be too high, and the devitrification temperature becomes high, and thereby the devitrification is likely to be problematic at the time of producing glass. Accordingly, the content of CaO is at most 9%, preferably at most 8%, more preferably at most 7.5%.

SrO improves the meltability without raising the devitrification temperature of glass, however, if the content of SrO is less than 1%, the effect is not likely to be obtained. Accordingly, the content of SrO is at least 1%, preferably at least 1.2%, more preferably at least 1.5%, further preferably at least 2%.

The above effect of SrO is inferior to that of BaO, and if SrO is excessive, the effect to increase the specific gravity defeats the above effect, and the average thermal expansion coefficient becomes too high. Accordingly, the content of SrO is at most 5%, preferably at most 4.5%, more preferably at most 4.2%, further preferably at most 4%.

BaO is not an essential component but may be contained for improving the meltability without raising the devitrification temperature of glass. However, if BaO is excessively contained, the specific gravity tends to be large, the Young's modulus tends to be low, and the average thermal expansion coefficient tends to be too high. Accordingly, the content of BaO is at most 1%, preferably at most 0.5%. More preferably, the alkali-free glass of the present invention substantially contains no BaO.

Here, in the present specification, "containing substantially no" means not containing other than unavoidable impurities. That is, it means not containing intentionally. In the present invention, substantially containing no BaO means, for example, at most 0.3%, preferably at most 0.2%.

In alkaline earth metal oxides, the smaller the radius of a cation is, the more the Young's modulus increases without increasing the specific gravity. That is, the effect to increase the specific elastic modulus is large. Thus, in the alkali-free glass of the present invention, [MgO]≥[CaO]≥[SrO]≥[BaO] is preferred. [MgO]≥[CaO]>[SrO]≥[BaO] is more preferred, [MgO]≥[CaO]>[SrO]>[BaO] is further preferred, and [MgO]>[CaO]>[SrO]>[BaO] is particularly preferred. Here, the expression of the component in "( )" means the content (mol %) of the component in the alkali-free glass (the same applies to other descriptions in the present specification).

If the total amount of the alkaline earth metal oxides, namely, MgO+CaO+SrO+BaO (hereinafter referred to also as "RO") is small, the temperature $T_4$ at which the viscosity of the glass reaches $10^4$ dPa·s becomes high, and thereby the lifespan of a housing structure of a float bath or a heater to be used for the float process may be extremely short. Thus, RO is preferably at least 15%, more preferably at least 15.5%, further preferably at least 16%.

If RO is too large, the average thermal expansion coefficient may not be low. Thus, RO is preferably at most 21%, more preferably at most 19%, further preferably at most 18.5%, particularly preferably at most 18%.

Further, MgO/RO is preferably at least 0.35, more preferably at least 0.37, further preferably at least 0.4. When RO and MgO/RO satisfy the above conditions, without raising the devitrification temperature, the phase-separation can be suppressed, the Young's modulus and the specific elastic modulus are made to be high, and the temperature $T_4$ at which the viscosity of the glass reaches $10^4$ dPa·s can be lowered.

Further, the difference between the temperature $T_2$ at which the glass viscosity reaches $10^2$ dPa·s and the strain point, namely ($T_2$-strain point) is made to be small.

MgO/RO is preferably at most 0.70, more preferably at most 0.65, further preferably at most 0.60. When MgO/RO is at most 0.70, ($T_2$-strain point) is made to be large.

The alkali-free glass of the present invention contains substantially no alkali metal oxide such as $Na_2O$ and $K_2O$. In the present invention, "containing substantially no alkali metal oxide" means, for example, at most 0.1%, preferably at most 0.08%, further preferably at most 0.05%, most preferably at most 0.03%.

In order to avoid deterioration of properties of a thin film such as a metal or an oxide to be formed on a surface of a glass plate at the time of using an alkali-free glass plate for producing a display, it is preferred that the alkali-free glass of the present invention contains substantially no $P_2O_5$. In the present invention, "containing substantially no $P_2O_5$" means, for example, at most 0.1%. Further, in order to facilitate recycle of glass, it is preferred that the alkali-free glass of the present invention contains substantially no PbO, $As_2O_3$ and $Sb_2O_3$. In the present invention, "containing substantially no PbO, $As_2O_3$ and $Sb_2O_3$" means, for example, that the contents of PbO, $As_2O_3$ and $Sb_2O_3$ are at most 0.01% respectively, preferably at most 0.005%.

In order to improve the melting property, the clarity, the moldability, etc. of glass, the alkali-free glass of the present invention may contain at least one member of $ZrO_2$, ZnO, $Fe_2O_3$, $SO_3$, F, Cl and $SnO_2$ in an amount of at most 2%, preferably at most 1%, more preferably at most 0.5% in total.

The alkali-free glass of the present invention has at least 85 of a value represented by the following formula (I):

$$[SiO_2]+0.7[Al_2O_3]+1.2[B_2O_3]+0.5[MgO]+0.4[CaO]-0.25[SrO]-0.88[BaO] \quad (I)$$

The value represented by the formula (I) is an index of a density (ρ) of the alkali-free glass, and if the value is less than 85%, the density is high. The value represented by the formula (I) is preferably at least 85.4, further preferably at least 85.8, particularly preferably at least 86. The value represented by the formula (I) is not particularly restricted, however, it is preferably at most 90, more preferably at most 88.

In the alkali-free glass of the present invention, the value represented by the following formula (II) is at least 72 and at most 75.

$$[SiO_2]+0.45[Al_2O_3]+0.21[B_2O_3]-0.042[MgO]+0.042[CaO]+0.15[SrO]+0.38[BaO] \quad (II)$$

The value represented by the formula (II) is an index of the melting temperature of the alkali-free glass, and if the value is less than 72, the temperature $T_2$ at which the glass viscosity reaches $10^2$ dPa·s becomes low. The value represented by the formula (II) is preferably at least 72.5, more preferably at least 73. If the value represented by the formula (II) exceeds 75, $T_2$ may be too high. The value is preferably at most 74, more preferably at most 73.5.

In the alkali-free glass of the present invention, the value represented by the following formula (III) is at most 19.

$$0.4[SiO_2]+0.4[Al_2O_3]+0.25[B_2O_3]-0.7[MgO]-0.88[CaO]-1.4[SrO]-1.7[BaO] \quad (III)$$

The value represented by the formula (III) is an index of the thermal expansion coefficient α of the alkali-free glass, and if the value exceeds 19, the average thermal expansion coefficient becomes too low. The value represented by the formula (III) is preferably at most 18.9, more preferably at most 18.7. The value represented by the formula (III) is not particularly restricted, however, the value is preferably at least 15.8, more preferably at least 16.5.

Here, the units of the values represented by the above formula (I) to (III) are percent (%), and they are represented by omitting their units.

The alkali-free glass of the present invention has a specific elastic modulus (Young's modulus (GPa)/density (g/cm$^3$)) of at least 32 MN·m/kg. The specific elastic modulus is preferably at least 33 MN-m/kg, more preferably at least 33.5 MN-m/kg. On the other hand, the specific elastic modulus is usually at most 36 MN·m/kg.

The alkali-free glass of the present invention has a strain point of from 690 to 710° C. If the stain point is less than 690° C., the deformation of the glass plate and the shrinkage (heat shrinkage) along with the structure stabilization of the glass tend to result, when the glass plate is exposed to a high temperature at a step of forming a thin film of a display. The strain point is preferably at least 695° C. On the other hand, if the strain point is too high, it is necessary to rise the temperature of a molding apparatus accordingly, and thereby the lifespan of the molding apparatus tends to be short. The strain point is preferably at most 705° C., more preferably at most 700° C.

The alkali-free glass of the present invention has a density of at most 2.54 g/cm$^3$ in order to realize the weight reduction of a product and increase the specific elastic modulus. The density is preferably at most 2.53 g/cm$^3$, more preferably at most 2.52 g/cm$^3$. On the other hand, the density is usually at least 2.40 g/cm$^3$.

The alkali-free glass of the present invention has an average thermal expansion coefficient at from 50 to 350° C. of at least 35×10$^{-7}$/° C. For example, in the production of a TFT side substrate of a flat panel display, a gate metal film such as copper and a gate insulating film such as silicon nitride are laminated in sequence on an alkali-free glass, however, if the average thermal expansion coefficient is less than $35 \times 10^{-7}/°$ C., the difference in the expansion coefficient between the gate insulating film and the glass is too small. In such a case, the effect of the gate insulating film to cancel the warpage of the glass due to the film formation of the gate metal film is small. As a result, problems result such that the substrate largely warps, and thereby troubles result on the transport, and the pattern shift at the time of exposure is large.

The average thermal expansion coefficient is preferably at least $35.2 \times 10^{-7}/°$ C., more preferably at least $35.5 \times 10^{-7}/°$ C. The upper limit of the average thermal expansion coefficient is not particularly restricted, however, from the viewpoint of the productivity in the production and the impact resistance, the upper limit is preferably at most $43 \times 10^{-7}/°$ C., more preferably at most $40 \times 10^{-7}/°$ C., further preferably at most $38.5 \times 10 - 7/°$ C.

The alkali-free glass of the present invention has a temperature $T_2$ at which the glass viscosity reaches $10^2$ dPa·s of from 1,610 to 1,680° C. If $T_2$ is less than 1,610° C., the clarity of the glass deteriorates, and the after mentioned erosion of a melting furnace due to a melt having a low viscosity and the burden of a heater for a molding apparatus increase. $T_2$ is preferably at least 1,620° C., more preferably at least 1,630° C. On the other hand, if $T_2$ exceeds 1,680° C., the meltability of the glass deteriorates, and the burden of a production apparatus increases, since a high temperature is required. $T_2$ is preferably at most 1,670° C., more preferably at most 1,660° C.

Further, the alkali-free glass of the present invention preferably has a temperature $T_4$ at which the glass viscosity reaches $10^4$ dPa·s of at most 1,320° C., more preferably at most 1,300° C., further preferably at most 1,297° C., particularly preferably at most 1,295° C. The glass having $T_4$ within the above range is suitably formed by a float method.

Further, the alkali-free glass of the present invention has a viscosity at the devitrification temperature (devitrification viscosity) of preferably at least $10^{3.6}$ poise (dPa·s). In such a case, the glass tends not to devitrificate, when formed by a fusion method or a float method. The devitrification viscosity is preferably at least $10^{3.8}$ poise, further preferably at least $10^{3.85}$ poise, particularly preferably at least $10^{3.9}$ poise.

The devitrification temperature in the present invention can be obtained as described below. That is, pulverized glass particles are put in a platinum dish and subjected to heat treatment for 17 hours in an electric furnace controlled at a constant temperature. After the heat treatment, the maximum temperature at which crystals precipitate on the surface and in the inside of the glass and the minimum temperature at which crystals do not precipitate are observed by means of an optical microscope, and their average value is the devitrification temperature. The viscosity at the devitrification temperature is obtained by measuring the viscosity of the glass at the devitrification temperature. If the devitrification temperature rises, the viscosity at the devitrification temperature becomes low, and the glass tends to devitrificate under a state that the temperature of molten glass is higher than the forming temperature. The devitrification temperature is preferably at most 1,330° C., more preferably at most 1,320° C., further preferably at most 1,310° C.

Further, the alkali-free glass of the present invention has a glass transition temperature of preferably from 730 to 770° C. If the glass transition temperature is lower than 730° C., the glass plate tends to deform and tends to shrink (heat shrink) along with the stabilization of the glass structure, when the glass plate is exposed to a high temperature at a step of forming a thin film of a display. The glass transition temperature is preferably at least 740° C., more preferably at least 745° C. On the other hand, if the glass transition temperature is too high, it is necessary to set a temperature of a molding apparatus a high temperature accordingly, and thereby the lifespan of the molding apparatus tends to be short. The glass transition temperature is preferably at most 760° C., more preferably at most 755° C.

Further, the alkali-free glass of the present invention has a Young's modulus of preferably at least 81 GPa. High Young's modulus increases the specific elastic modulus and improves the fracture toughness of the glass, and thereby is suitable for a substrate glass for various displays and a substrate glass for a photomask in which the large size and the thin size of the glass plate is desired. The Young's modulus is more preferably at least 82 GPa, further preferably at least 83 GPa, further preferably at least 83.5 GPa, particularly preferably at least 84 GPa, most preferably at least 84.5 GPa. The Young's modulus can be measured by a ultrasonic method. On the other hand, the Young's modulus is usually at most 88 GPa.

Further, the difference between the temperature $T_2$ at which the glass viscosity of the alkali-free glass of the present invention reaches $10^2$ dPa·s and the strain point, namely ($T_2$-strain point) is preferably from 920 to 1,000° C. If ($T_2$-strain point) is lower than 920° C., when forming glass, the distribution of the temperature is large, and thereby it is difficult to uniform the plate thickness. ($T_2$-strain point) is preferably at least 930° C., more preferably at least 935° C. On the other hand, if ($T_2$-strain point) exceeds 1,000° C., sensible heat transferred with glass from a melting furnace to a forming apparatus is low, and thereby the load of a heater in the forming apparatus increases, and the burden of the forming apparatus increases. ($T_2$-strain point) is preferably at most 980° C., further preferably at most 970° C.

The plate thickness of the alkali-free glass of the present invention is not particularly restricted, however, it is preferred to form a glass plate having the plate thickness of at most 1.0 mm. By reducing the plate thickness, the weight reduction of a display can be easily achieved. The glass plate to be formed has a plate thickness of preferably at most 0.7 mm, more preferably at most 0.5 mm, furthermore preferably at most 0.4 mm, particularly preferably at most 0.35 mm, most preferably at most 0.25 mm. The plate thickness may be at most 0.1 mm or at most 0.05 mm. However, from the viewpoint of preventing the deflection due to its own weight, the plate thickness is preferably at least 0.1 mm, more preferably at most 0.2 mm.

The production of the alkali-free glass of the present invention may, for example, be carried out by the following procedure.

Raw materials of the above respective components are blended so as to be the desired contents in the glass composition, added in a melting furnace and heated and melted at from 1,500 to 1,800° C. to obtain molten glass. The obtained molten glass is formed into a glass ribbon having the predetermined plate thickness by a forming device, and the glass ribbon is annealed and cut to obtain alkali-free glass.

In the present invention, the molten glass is preferably formed into a glass plate by a float method, a fusion method or the like. Employing the fusion method, the average cooling rate at the vicinity of the glass transition temperature becomes high, whereby when subjecting the obtained glass plate to hydrofluoric acid (HF) etching treatment to make the glass plate a thin film, the surface roughness of a surface of the side treated with hydrofluoric acid (HF) in the glass plate tends to be small, and the strength of the glass plate tends to improve. On the other hand, from the viewpoint of stably producing a large size plate glass (for example, one side is at least 2 m), the float method is preferred.

EXAMPLES

Now, Examples will be described, however, the present invention is by no means restricted to these Examples. Examples 1 to 20 and 25 to 36 are working examples, and Examples 21 to 24 are comparative examples.

Raw materials of the respective components were blended so that the glass composition would be the desired composition (unit: mol %) mentioned in Tables 1 to 3, and melted in a platinum crucible at 1,600° C. for 1 hour. Then, the melt was flow out on a carbon plate and kept at a temperature of (glass transition temperature+30° C.) for 60 minutes and then cooled to room temperature (25° C.) at a rate of 1° C./min to obtain a plate shape glass. The plate shape glass was mirror polished to obtain a glass plate, and respective evaluations were carried out. Results are shown in Tables 1 to 3. Further, in Tables 1 to 3, values mentioned in ( ) are calculated values.

The methods for measuring respective physical properties are described below.

(Average Thermal Expansion Coefficient)

The average thermal expansion coefficient was measured by means of a differential thermodilatometer (TMA) in accordance with the method stipulated in JIS R3102 (1995). The measuring temperature range was from 50 to 350° C., and it was represented by unit of $10^{-7}/°$ C.

(Density)

The density was measured by using about 20 g of a glass block containing no bubble by the Archimedes' method in accordance with the method stipulated in JIS Z 8807.

(Strain Point)

The strain point was measured in accordance with the method stipulated in JIS R3103-2 (2001).

(Glass Transition Temperature Tg)

The glass transition temperature was measured by means of a differential thermodilatometer (TMA) in accordance with the method stipulated in JIS R3103-3 (2001).

(Young's Modulus)

The Young's modulus of glass having a thickness of from 0.5 to 10 mm was measured by the supersonic pulse method in accordance with the method stipulated in JIS Z 2280.

($T_2$)

The temperature $T_2$ (° C.) at which viscosity reaches $10^2$ dPa·s was measured by means of a rotational viscometer in accordance with the method stipulated in ASTM C 965-96.

($T_4$)

The temperature $T_4$ (° C.) at which the viscosity reaches $10^4$ dPa·s was measured by means of a rotational viscometer in accordance with the method stipulated in ASTM C 965-96.

(Devitrification Temperature)

The devitrification temperature was obtained by the above described method.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| $SiO_2$ | 66.1 | 65.8 | 66.1 | 66.7 | 66.0 | 67.8 | 65.1 | 67.1 | 66.0 | 67.4 | 68.5 | 68.4 |
| $Al_2O_3$ | 13.0 | 13.2 | 12.1 | 11.6 | 13.0 | 12.5 | 13.2 | 12.2 | 11.3 | 12.4 | 11.2 | 11.2 |
| $B_2O_3$ | 4.5 | 4.7 | 4.5 | 4.7 | 4.7 | 3.5 | 5.2 | 4.2 | 4.5 | 3.3 | 3.6 | 4.1 |
| MgO | 7.7 | 8.0 | 7.5 | 8.0 | 8.8 | 8.8 | 7.4 | 9.1 | 8.2 | 9.6 | 9.7 | 8.9 |
| CaO | 6.9 | 4.9 | 7.5 | 4.9 | 4.7 | 3.9 | 5.9 | 4.7 | 7.0 | 3.8 | 3.8 | 4.5 |
| SrO | 1.8 | 3.4 | 2.3 | 4.1 | 2.8 | 3.5 | 3.2 | 2.7 | 3.0 | 3.5 | 3.2 | 2.9 |
| BaO | 0 | 0 | 0 | 0 | 0 | 0 | 0 | 0 | 0 | 0 | 0 | 0 |
| RO | 16.4 | 16.3 | 17.3 | 17.0 | 16.3 | 16.2 | 16.5 | 16.5 | 18.2 | 16.9 | 16.7 | 16.3 |
| MgO/RO | 0.47 | 0.49 | 0.43 | 0.47 | 0.54 | 0.54 | 0.45 | 0.55 | 0.45 | 0.57 | 0.58 | 0.55 |
| Parameter of formula (I) | 86.8 | 85.8 | 86.1 | 85.4 | 86.3 | 85.8 | 85.8 | 86.4 | 85.5 | 85.5 | 86.2 | 86.7 |
| Parameter of formula (II) | 73.1 | 73.1 | 72.8 | 73.4 | 73.1 | 74.5 | 72.5 | 73.7 | 72.4 | 74.0 | 74.5 | 74.6 |
| Parameter of formula (III) | 18.8 | 18.1 | 17.3 | 16.8 | 18.6 | 18.5 | 17.8 | 18.5 | 15.9 | 17.8 | 18.2 | 18.6 |
| Average thermal expansion coefficient ($\times 10^{-7}/°$ C.) | 36.5 | 35.9 | 38.0 | 37.7 | 35.5 | 35.1 | 36.9 | 35.4 | 38.6 | 36.9 | (35.6) | (35.6) |
| Density (g/cm$^3$) | 2.50 | 2.52 | 2.51 | 2.52 | 2.50 | 2.51 | 2.51 | 2.50 | 2.52 | 2.52 | (2.51) | (2.50) |
| Strain point (° C.) | 699 | 700 | 690 | 690 | 699 | 709 | 696 | 701 | 686 | 710 | (706) | (702) |
| Glass transition temperature (° C.) | 751 | 754 | 741 | 740 | 752 | 761 | 748 | 751 | 737 | 760 | (758) | (754) |
| Young's modulus (GPa) | 84.9 | 84.8 | 84.3 | 83.4 | 84.9 | 84.9 | 84.0 | 84.7 | 83.9 | 85.7 | (83.3) | (82.4) |
| $T_2$ (° C.) | 1638 | 1637 | 1636 | 1653 | 1641 | 1672 | 1625 | 1655 | 1634 | 1662 | (1670) | (1671) |
| $T_4$ (° C.) | 1288 | 1289 | 1282 | 1291 | 1290 | 1311 | 1278 | 1297 | 1274 | 1304 | (1303) | (1301) |
| $T_2$-strain point (° C.) | 939 | 937 | 946 | 963 | 942 | 964 | 929 | 954 | 948 | 952 | (965) | (969) |
| Devitrification temperature (° C.) | 1285 | 1285 | 1285 | 1305 | 1305 | 1295 | 1325 | 1295 | 1265 | 1275 | — | — |
| Specific elastic modulus (MNm/kg) | 34.0 | 33.7 | 33.6 | 33.1 | 34.0 | 33.8 | 33.4 | 33.9 | 33.3 | 34.0 | (33.2) | (33.0) |
| Devitrification viscosity (dPa · s) | $10^{4.02}$ | $10^{4.03}$ | $10^{3.97}$ | $10^{3.90}$ | $10^{3.88}$ | $10^{4.12}$ | $10^{3.65}$ | $10^{4.02}$ | $10^{4.07}$ | $10^{4.23}$ | — | — |

TABLE 2

|  | Ex. 13 | Ex. 14 | Ex. 15 | Ex. 16 | Ex. 17 | Ex. 18 |
|---|---|---|---|---|---|---|
| $SiO_2$ | 66.8 | 68.0 | 68.1 | 68.1 | 67.5 | 66.7 |
| $Al_2O_3$ | 11.9 | 11.7 | 11.7 | 12.4 | 12.4 | 13.6 |
| $B_2O_3$ | 4.5 | 3.9 | 3.7 | 3.5 | 4.3 | 3.7 |
| MgO | 8.9 | 8.9 | 9.5 | 8.5 | 7.2 | 8.6 |
| CaO | 4.3 | 4.4 | 4.1 | 3.8 | 4.8 | 4.1 |
| SrO | 3.6 | 3.1 | 2.9 | 3.7 | 3.7 | 3.3 |
| BaO | 0 | 0 | 0 | 0 | 0.1 | 0 |
| RO | 16.8 | 16.4 | 16.5 | 16.0 | 15.8 | 16.0 |
| MgO/RO | 0.53 | 0.54 | 0.58 | 0.53 | 0.46 | 0.54 |
| Parameter of formula (I) | 85.8 | 86.3 | 86.4 | 85.8 | 85.8 | 85.8 |
| Parameter of formula (II) | 73.4 | 74.4 | 74.4 | 74.8 | 74.5 | 73.9 |
| Parameter of formula (III) | 17.6 | 18.4 | 18.5 | 18.6 | 18.4 | 18.8 |
| Average thermal expansion coefficient ($\times 10^{-7}$/° C.) | (36.7) | 35.3 | (35.4) | (35.6) | (36.5) | 33.2 |
| Density (g/cm$^3$) | (2.52) | 2.50 | (2.51) | (2.52) | (2.52) | 2.52 |
| Strain point (° C.) | (696) | 705 | (706) | (709) | (702) | 714 |
| Glass transition temperature (° C.) | (750) | 751 | (759) | (764) | (756) | 768 |
| Young's modulus (GPa) | (82.6) | 84.2 | (83.4) | (83.3) | (81.9) | 85.6 |
| $T_2$ (° C.) | (1649) | 1672 | (1667) | (1675) | (1670) | 1652 |
| $T_4$ (° C.) | (1287) | 1308 | (1301) | (1309) | (1303) | 1301 |
| $T_2$-strain point (° C.) | (953) | 967 | (961) | (966) | (968) | 938 |
| Devitrification temperature (° C.) | — | 1295 | — | — | — | 1255 |
| Specific elastic modulus (MNm/kg) | (32.8) | 33.7 | (33.3) | (33.1) | (32.5) | 34.0 |
| Devitrification viscosity (dPa · s) | — | $10^{4.10}$ | — | — | — | $10^{4.37}$ |

|  | Ex. 19 | Ex. 20 | Ex. 21 | Ex. 22 | Ex. 23 | Ex. 24 |
|---|---|---|---|---|---|---|
| $SiO_2$ | 65.6 | 67.0 | 66.9 | 65.1 | 68.2 | 66.3 |
| $Al_2O_3$ | 12.3 | 12.3 | 13.0 | 9.9 | 13.0 | 12.9 |
| $B_2O_3$ | 5.2 | 4.3 | 1.3 | 5.5 | 3.8 | 5.4 |
| MgO | 9.7 | 7.9 | 9.0 | 10.5 | 6.8 | 6.9 |
| CaO | 5.8 | 4.8 | 5.3 | 8.0 | 3.8 | 6.0 |
| SrO | 1.4 | 3.7 | 4.5 | 1.0 | 4.4 | 2.5 |
| BaO | 0 | 0 | 0 | 0 | 0 | 0 |
| RO | 16.9 | 16.4 | 18.8 | 19.5 | 15.0 | 15.4 |
| MgO/RO | 0.57 | 0.48 | 0.48 | 0.54 | 0.45 | 0.45 |
| Parameter of formula (I) | 87.3 | 85.7 | 83.1 | 86.8 | 85.7 | 87.0 |
| Parameter of formula (II) | 72.3 | 73.9 | 73.5 | 70.8 | 75.4 | 73.6 |
| Parameter of formula (III) | 18.6 | 17.9 | 15.0 | 15.6 | 19.2 | 19.4 |
| Average thermal expansion coefficient ($\times 10^{-7}$/° C.) | (35.7) | (36.8) | 40.4 | 38.8 | 34.9 | 34.1 |
| Density (g/cm$^3$) | (2.49) | (2.52) | 2.59 | 2.48 | 2.52 | 2.50 |
| Strain point (° C.) | (691) | (700) | 714 | 669 | — | 702 |
| Glass transition temperature (° C.) | (744) | (754) | 779 | 713 | 748 | 755 |
| Young's modulus (GPa) | (83.1) | (82.5) | 87.0 | 84.4 | 83.5 | 82.9 |
| $T_2$ (° C.) | (1627) | (1658) | 1644 | 1601 | 1687 | — |
| $T_4$ (° C.) | (1269) | (1294) | 1298 | 1251 | 1324 | 1282 |
| $T_2$-strain point (° C.) | (936) | (958) | 930 | 932 | — | — |
| Devitrification temperature (° C.) | — | — | 1275 | 1335 | — | — |
| Specific elastic modulus (MNm/kg) | (33.4) | (32.7) | 33.6 | 34.0 | 33.1 | 33.2 |
| Devitrification viscosity (dPa · s) | — | — | $10^{4.18}$ | $<10^{3.39}$ | — | — |

TABLE 3

|  | Ex. 25 | Ex. 26 | Ex. 27 | Ex. 28 | Ex. 29 | Ex. 30 |
|---|---|---|---|---|---|---|
| $SiO_2$ | 64.7 | 64.9 | 66.1 | 66.1 | 67.6 | 66.7 |
| $Al_2O_3$ | 13.4 | 12.9 | 12.4 | 12.6 | 12.6 | 13.4 |
| $B_2O_3$ | 4.9 | 4.4 | 4.3 | 4.8 | 3.5 | 3.5 |
| MgO | 8.9 | 8.4 | 8.1 | 7.8 | 7.7 | 8.2 |
| CaO | 4.3 | 6.3 | 6.9 | 6.9 | 4.3 | 4.1 |

TABLE 3-continued

|  |  |  |  |  |  |  |
|---|---|---|---|---|---|---|
| SrO | 3.8 | 3.1 | 2.2 | 1.8 | 4.3 | 4.1 |
| BaO | 0 | 0 | 0 | 0 | 0 | 0 |
| RO | 17.0 | 17.8 | 17.2 | 16.5 | 16.3 | 16.4 |
| MgO/RO | 0.52 | 0.47 | 0.47 | 0.47 | 0.47 | 0.50 |
| Parameter of formula (I) | 85.2 | 85.2 | 86.2 | 86.9 | 85.1 | 85.0 |
| Parameter of formula (II) | 72.1 | 72.0 | 72.9 | 73.0 | 74.5 | 73.9 |
| Parameter of formula (III) | 17.1 | 16.5 | 17.7 | 18.6 | 17.8 | 17.8 |
| Average thermal expansion coefficient ($\times 10^{-7}/°$ C.) | (37.0) | (38.2) | (37.3) | (36.5) | (37.0) | (36.8) |
| Density (g/cm$^3$) | (2.53) | (2.53) | (2.51) | (2.49) | (2.53) | (2.53) |
| Strain point (° C.) | (693) | (694) | (697) | (695) | (710) | (710) |
| Glass transition temperature (° C.) | (749) | (748) | (749) | (748) | (763) | (765) |
| Young's modulus (GPa) | (84.0) | (84.3) | (84.0) | (83.5) | (83.7) | (84.5) |
| T$_2$ (° C.) | (1618) | (1616) | (1634) | (1636) | (1670) | (1657) |
| T$_4$ (° C.) | (1270) | (1266) | (1278) | (1279) | (1310) | (1302) |
| T$_2$-strain point (° C.) | (925) | (922) | (937) | (942) | (961) | (947) |
| Devitrification temperature (° C.) | — | — | — | — | — | — |
| Specific elastic modulus (MNm/kg) | (33.2) | (33.3) | (33.5) | (33.5) | (33.0) | (33.3) |
| Devitrification viscosity (dPa · s) | — | — | — | — | — | — |

|  | Ex. 31 | Ex. 32 | Ex. 33 | Ex. 34 | Ex. 35 | Ex. 36 |
|---|---|---|---|---|---|---|
| SiO$_2$ | 67.9 | 66.6 | 66.4 | 65.7 | 65.7 | 65.7 |
| Al$_2$O$_3$ | 12.4 | 12.7 | 12.7 | 12.7 | 12.7 | 12.7 |
| B$_2$O$_3$ | 4.4 | 3.3 | 3.6 | 4.2 | 4.2 | 4.2 |
| MgO | 7.1 | 9.8 | 8.7 | 8.7 | 8.6 | 8.7 |
| CaO | 4.1 | 5.6 | 6.6 | 6.6 | 6.2 | 7.5 |
| SrO | 4.1 | 2.0 | 2.0 | 2.1 | 2.1 | 1.2 |
| BaO | 0 | 0 | 0 | 0 | 0.5 | 0 |
| RO | 15.3 | 17.4 | 17.3 | 17.4 | 17.4 | 17.4 |
| MgO/RO | 0.46 | 0.56 | 0.50 | 0.50 | 0.49 | 0.50 |
| Parameter of formula (I) | 86.0 | 86.1 | 86.1 | 86.1 | 85.4 | 86.7 |
| Parameter of formula (II) | 74.9 | 73.1 | 73.1 | 72.5 | 72.7 | 72.4 |
| Parameter of formula (III) | 18.9 | 18.0 | 17.8 | 17.6 | 17.1 | 18.0 |
| Average thermal expansion coefficient ($\times 10^{-7}/°$ C.) | (36.0) | (36.3) | (36.9) | (37.1) | (37.4) | (36.8) |
| Density (g/cm$^3$) | (2.51) | (2.51) | (2.51) | (2.51) | (2.53) | (2.50) |
| Strain point (° C.) | (705) | (707) | (704) | (697) | (699) | (697) |
| Glass transition temperature (° C.) | (758) | (759) | (757) | (751) | (753) | (750) |
| Young's modulus (GPa) | (82.2) | (86.1) | (85.2) | (84.7) | (84.1) | (85.0) |
| T$_2$ (° C.) | (1678) | (1639) | (1638) | (1626) | (1629) | (1624) |
| T$_4$ (° C.) | (1313) | (1288) | (1284) | (1274) | (1277) | (1271) |
| T$_2$-strain point (° C.) | (973) | (933) | (935) | (929) | (931) | (927) |
| Devitrification temperature (° C.) | — | — | — | — | — | — |
| Specific elastic modulus (MNm/kg) | (32.7) | (34.3) | (33.9) | (33.7) | (33.3) | (34.0) |
| Devitrification viscosity (dPa · s) | — | — | — | — | — | — |

It is evident from Tables 1 to 3 that the glass in Examples 1 to 20 and 25 to 36 satisfy all properties of the present invention and have good specific elastic modulus, strain point, density, thermal expansion coefficient and T$_2$.

On the other hand, the glass in Example 21 has B$_2$O$_3$ of less than 3% and thereby has an excessively high strain point. Further, the glass in Example 21 has a lower value represented by the formula (I) than the range limited in the present invention and has a high density. The glass in Example 22 has a lower value represented by the formula (II) than the range limited in the present invention and thereby has a low T$_2$. As a result, the melting temperature is low, the clarity deteriorates, and the form property of glass is poor. The glass in Example 22 also has a low strain point. The glass in Example 23 has a higher value represented by the formula (II) than the range limited in the present invention, and thereby has a high T$_2$. As a result, the clarity is poor. Further, the glass in Example 23 has a higher value represented by the formula (III) than the range limited in the present invention, and as a result, the thermal expansion coefficient becomes too low. The glass in Example 24 also has a higher value represented by the formula (III) than the range limited in the present invention, and a low content of MgO, and thereby the thermal expansion coefficient becomes too low.

INDUSTRIAL APPLICABILITY

The alkali-free glass of the present invention is hardly deflected and thereby suitable in the application of the glass plate, particularly suitable as a high quality glass for a substrate such as a display or a photomask.

What is claimed is:
1. An alkali-free glass, which comprises, as represented by mol % based on oxides,
SiO$_2$ 65.5 to 70%,
Al$^2$O$_3$ 11 to 14%,
B$_2$O$_3$ 3 to 5.5%,
MgO 7 to 10%,
CaO 3 to 9%,
SrO 1 to 5% and
BaO 0 to 1%,
wherein
the mol % content of the alkaline earth metals is related according to [MgO]>[CaO]>[SrO]>[BaO],

$[SiO_2]+0.7[Al_2O_3]+1.2[B_2O_3]+0.5[MgO]0.4[CaO]-0.25[SrO]-0.88[BaO]$ is at least 85,
$[SiO_2]+0.45[Al_2O_3]+0.21[B_2O_3]-0.042[MgO]+0.042[CaO]+0.15[SrO]+0.38[BaO]$ is from 72 to 75,
$0.4[SiO_2]0.4[Al_2O_3]0.25[B_2O_3]-0.7[MgO]-0.88[CaO]-1.4[SrO]-1.7[BaO]$ is at most 19,
the specific modulus is at least 32 MN·m/kg,
the strain point is from 690 to 710° C.,
the density is at most 2.54 g/cm³,
the average thermal expansion coefficient at from 50 to 350° C. is at least $35 \times 10^{-7}$/° C., and
the temperature $T_2$ at which the glass viscosity reaches $10^2$ dPa·s is from 1,610 to 1,680° C.

2. The alkali-free glass according to claim 1, wherein the mol % of MgO/(MgO+CaO+SrO+BaO) is from 15 to 21%.

3. The alkali-free glass according to claim 1, wherein the mol % ratio MgO/(MgO+CaO+SrO+BaO) is from 0.35 to 0.70.

4. The alkali-free glass according to claim 1, wherein the temperature $T_4$ at which the glass viscosity reaches $10^4$ dPa·s is at most 1,320° C.

5. The alkali-free glass according to claim 1, wherein the devitrification viscosity is at least $10^{3.6}$ d·Pas.

6. The alkali-free glass according to claim 1, wherein the Young's modulus is at least 81 GPa.

7. The alkali-free glass according to claim 1, wherein a $T_2$-strain point is from 920 to 1,000° C.

8. The alkali-free glass according to claim 1, wherein the glass transition temperature is from 730 to 770° C.

9. The alkali-free glass according to claim 1, which is a glass plate having a thickness of from 0.1 to 2.0 mm.

10. The alkali-free glass according to claim 1, which is produced by a float method or a fusion method.

* * * * *